United States Patent
Oezgen

(10) Patent No.: US 7,305,613 B2
(45) Date of Patent: Dec. 4, 2007

(54) INDEXING STRUCTURED DOCUMENTS

(75) Inventor: Markus Oezgen, Paulinenaue (DE)

(73) Assignee: SAP Aktiengesellschaft, Walldorf (DE)

(*) Notice: Subject to any disclaimer, the term of this patent is extended or adjusted under 35 U.S.C. 154(b) by 410 days.

(21) Appl. No.: 10/161,086

(22) Filed: May 31, 2002

(65) Prior Publication Data

US 2003/0226108 A1 Dec. 4, 2003

(51) Int. Cl.
*G06F 3/048* (2006.01)

(52) U.S. Cl. .................. 715/511; 715/513; 715/530

(58) Field of Classification Search ........... 715/500, 715/513, 530, 511
See application file for complete search history.

(56) References Cited

U.S. PATENT DOCUMENTS

| | | | | |
|---|---|---|---|---|
| 5,276,616 | A * | 1/1994 | Kuga et al. .................. 704/10 |
| 6,240,407 | B1 * | 5/2001 | Chang et al. .................. 707/2 |
| 6,360,215 | B1 * | 3/2002 | Judd et al. .................... 707/3 |
| 6,366,934 | B1 * | 4/2002 | Cheng et al. ............... 715/513 |
| 6,421,656 | B1 * | 7/2002 | Cheng et al. .................. 707/2 |
| 6,519,597 | B1 * | 2/2003 | Cheng et al. ................ 707/10 |
| 6,584,459 | B1 * | 6/2003 | Chang et al. .................. 707/3 |
| 6,804,677 | B2 * | 10/2004 | Shadmon et al. .......... 707/101 |
| 6,823,492 | B1 * | 11/2004 | Ambroziak ................. 715/530 |
| 6,938,046 | B2 * | 8/2005 | Cooke et al. ............... 707/101 |
| 2001/0011271 | A1 * | 8/2001 | Takahashi et al. ............. 707/3 |
| 2002/0083039 | A1 * | 6/2002 | Ferrari et al. .................. 707/1 |
| 2002/0095409 | A1 * | 7/2002 | Takahashi et al ............. 707/3 |
| 2002/0095410 | A1 * | 7/2002 | Takahashi et al. ............. 707/3 |
| 2002/0120598 | A1 * | 8/2002 | Shadmon et al. .............. 707/1 |
| 2002/0133516 | A1 * | 9/2002 | Davis et al. ................. 707/513 |
| 2002/0138582 | A1 * | 9/2002 | Chandra et al. ............ 709/206 |
| 2002/0152244 | A1 * | 10/2002 | Dean et al. ................. 707/530 |
| 2002/0169744 | A1 * | 11/2002 | Cooke et al. .................. 707/1 |
| 2003/0078934 | A1 * | 4/2003 | Cappellucci et al. ....... 707/101 |
| 2003/0200234 | A1 * | 10/2003 | Koppich et al. ............ 707/203 |
| 2004/0205047 | A1 * | 10/2004 | Carpenter ...................... 707/3 |

OTHER PUBLICATIONS

Lennartz, Sven; "Ich Bin Wichtig"; *C'T Magazin Für Computertechnik*; No. 23; Nov. 8, 1999; pp. 180-186.

Mauldin, M.; "Spidering BOF Report"; *Internet, 'Online'*; Jun. 16, 2001; pp. 1-2.

Tan, K.F. et al.; "FIBEX, An Extractor Enabling Querying Of Documents Using SQL"; *IEEE Internet Computing*; Aug. 28, 1998; pp. 108-112.

(Continued)

*Primary Examiner*—Cesar Paula
*Assistant Examiner*—Gregory J. Vaughn
(74) *Attorney, Agent, or Firm*—Fish & Richardson P.C.

(57) ABSTRACT

Methods and apparatus, including computer program products, for indexing structured documents. A method includes identifying a structured document in a file system for indexing, the structured document having an identifier and at least one indexing-property, extracting at least one index-value from the structured document in accordance with a pre-defined extraction rule-set and storing the at least one index-value with the identifier in an index-value data structure.

20 Claims, 3 Drawing Sheets

OTHER PUBLICATIONS

Whitehead, E.J. et al.; "WebDAV: IEFT Standard For Collaborative Authoring On The Web"; *IEEE Internet Computing*; vol. 2, No. 5; Sep. 1998; pp. 34-40.

W3C: "XML Path Language (Xpath) Version 1.0"; *Internet, 'Online'*; Nov. 16, 1999; 22 pgs.

Kasukawa, Takeya, et al., "A New Method for Maintaining Semi-Structured Data Described in XML," *1999 IEEE Pacific Rim Conference on Communications, Computers and Signal Processing*, Victoria, British Columbia, Canada, Aug. 22, 1999, pp. 258-261, XP010356593.

Schoening, Harald, "Tamino—a DBMS Designed for XML," Proceedings of the 17th International Conference on Data Engineering (ICDE'2001), Heidelberg, Germany, Apr. 2, 2001, pp. 149-154, XP010538056.

Najork, M., et al., "High-Performance Web Crawling", SRC Research Report, Sep. 26, 2001, Palo Alto, CA, pp. 1-20.

Goland, Y., et al., "RFC 2518: HTTP Extensions for Distributed Authoring—WEBDAV", IETF Request for Comments: Network Working Group, Feb. 1999, XP015009179, pp. 1-94.

\* cited by examiner

INDEXING STRUCTURED DOCUMENTS

BACKGROUND

The present invention relates to indexing structured documents.

Servers located around the Internet and contained in Intranets serve up content (e.g., pages, documents) to users on demand. A user, interacting through a search engine, enters a text query for information and the search results are displayed to the user as text, graphics, audio and/or video through a graphical user interface most often referred to as browser software. There are several functions that are part of a search engine, such as information gathering, indexing, categorization, and searching. Information gathering usually uses Web crawlers to send visited pages to an index engine. The index engine uses some form of inverted files and, given a word, returns a list of references that contain the word. Categorization, or clustering, attempts to categorize the pages according to attributes, such as topics. The searching allows the user to ask content-based queries and get ranked result sets.

SUMMARY

In one aspect, the invention features a method for indexing structured documents including identifying a structured document in a file system for indexing, the structured document having an identifier and at least one indexing-property, extracting at least one index-value from the structured document in accordance with a pre-defined extraction rule-set, and storing the at least one index-value with the identifier in an index-value data structure.

One or more of the following may also be included. The file system for indexing may be a Web based Distributed Authoring and Versioning (WebDAV) file system. The at least one indexing-property may be selected from the group of document-type, URL and document-version. The structured document may be a markup language document with a markup-language selected from the group of XML, XHTML and WML. The index-value data structure may be stored as a relational database table. The WebDAV file system may be stored in a relational database management system (RDMS). The pre-defined extraction rule set may include XPath-expressions. The file system may be processed by a first processor and identifying, extracting and storing may be executed by a second processor.

Identifying, extracting and storing may be executed synchronously or asynchronously when generating the structured document in the WebDAV file system.

Identifying, extracting and storing may be repeated for a number of structured documents in the file system.

In another aspect, the invention features a method including identifying a plurality of structured documents in a file system for indexing, each of the structured documents having an identifier and at least one indexing-property, extracting at least one index-value from each of the structured documents in accordance with a pre-defined extraction rule-set, and storing the at least one index-value with the identifier in an index-value data structure for each of the plurality of structured documents.

One or more of the following may also be included. Identifying may include determining whether the structured document is locked. The file system may be a WebDAV file system. Each of the structured documents may be a markup language document.

Embodiments of the invention may have one or more of the following advantages.

The process allows a user to ask structured queries into a database of structured documents.

The process improves intelligent indexing of structured documents for providing scalable search engines in a Web-based Distributed Authoring and Versioning (WebDAV) file system environment.

The process indexes structured documents in a relational database and can perform versioned indexing, i.e., indexing of multiple versions of a structured document.

The process can execute on multiple processors synchronously or asynchronously.

Other features, objects, and advantages of the invention will be apparent from the description and drawings, and from the claims.

DETAILED DESCRIPTION

Figure 1:
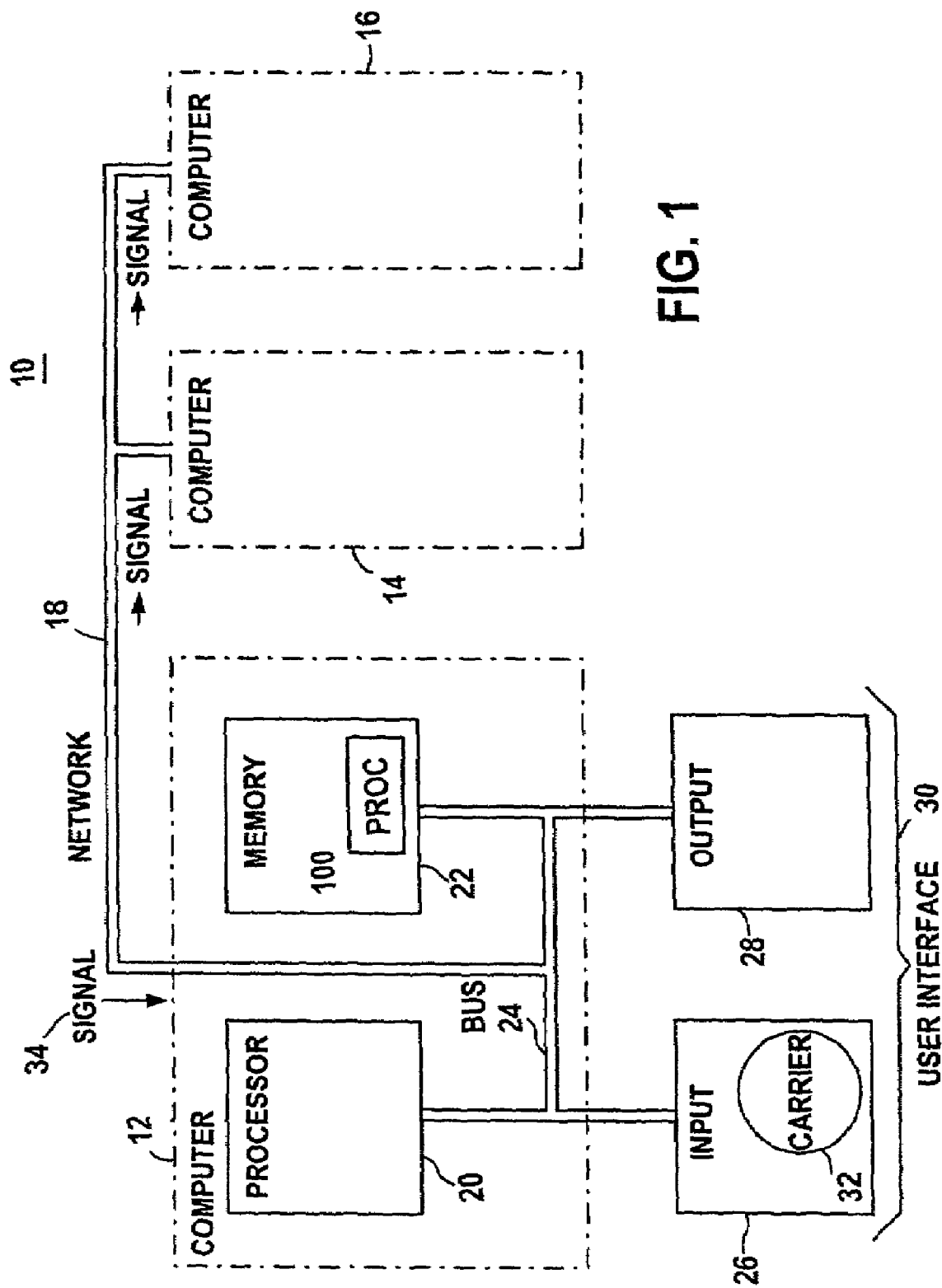
FIG. 1 is a block diagram of a system.

As shown in FIG. 1, a system 10 includes a computer 12 linked to computers 14, 16 via a network 18. Computer 12 includes processor 20, memory 22, bus 24, and, optionally, input device 26 and output device 28. Input device 26 and output device 28 are sometimes collectively referred to as a user interface (UI) 30. Memory 22 includes an indexing structured documents process 100 that communicates with a carrier 32 and generates a signal 34.

Figure 2:
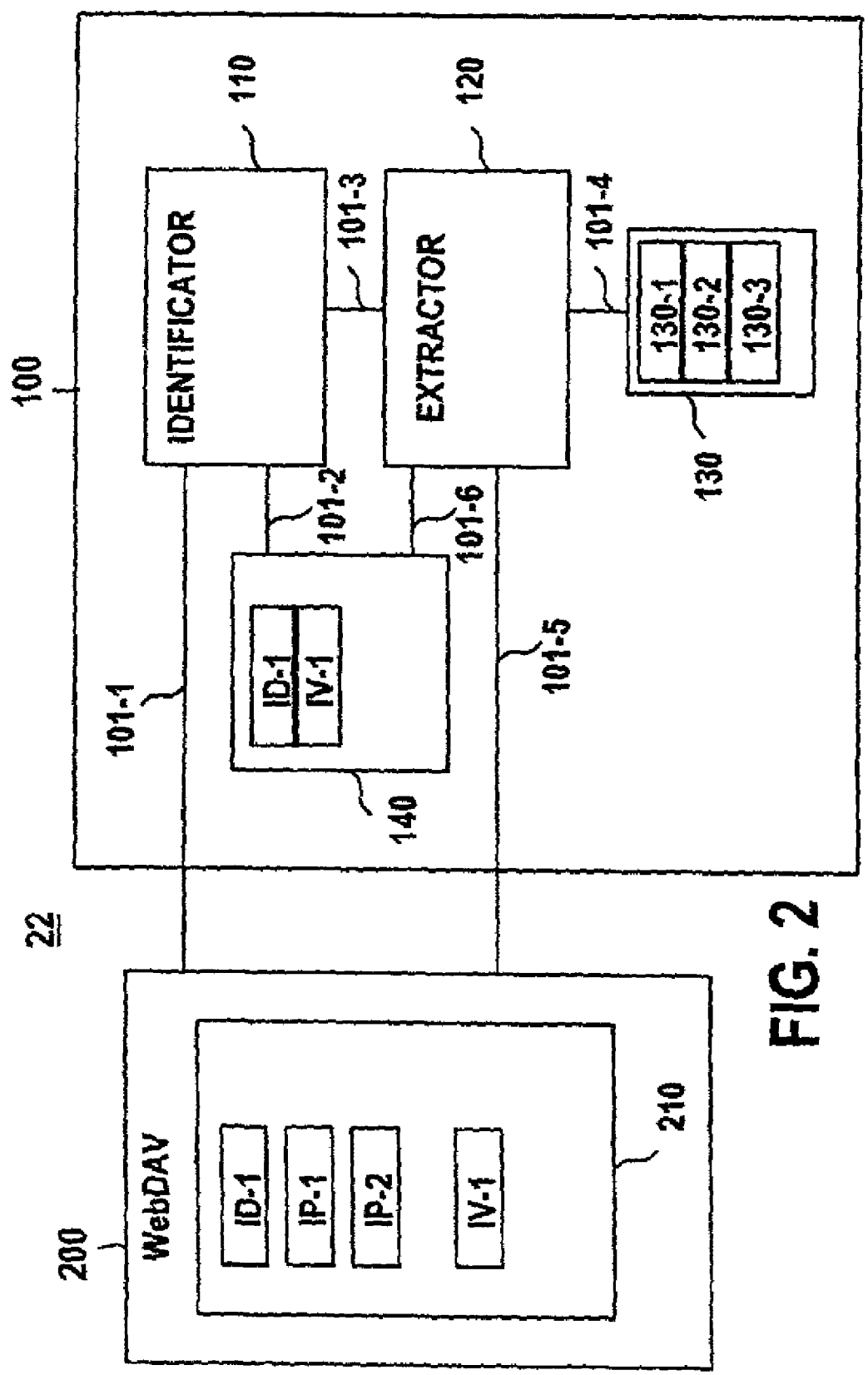
FIG. 2 is a block diagram of the memory of FIG. 1.

As shown in FIG. 2, memory 22 includes a World Wide Web Distributed Authoring and Versioning (WebDAV) file system 200 linked to process 100. The WebDAV file system 200 may be used to administer structured documents. WebDAV is an Internet Engineering Task Force (IETF) standard for collaborative authoring on the Web, a set of extensions to the Hypertext Transfer Protocol (HTTP) that facilitates collaborative editing and file management between users located remotely from each other on the Internet.

WebDAV enables remote groups to work together in various ways. For example, WebDAV—conforming tools may be used by a virtual organization to develop business plans, create software, or write libraries of information. A WebDAV work group is part of the applications section of the World Wide Web Consortium (W3C); their charter states its goal as to "define the HTTP extensions necessary to enable distributed Web authoring tools to be broadly interoperable, while supporting user needs." WebDAV adds write access to the read access afforded by HTTP. WebDAV enables users to collaborate over the World Wide Web in the same way as they might over a corporate intranet.

WebDAV features include:

Locking (also known as concurrency control), which prevents accidental overwriting of files.

XML properties, which facilitate operations (such as storage and retrieval) on metadata, that data about other data that can be organized;

The DAV protocol, which enables property setting, deleting, and retrieving;

The DASL (DAV Searching and Locating) protocol, which enables searches based on property values for locating resources on the Web;

namespace manipulation, which supports copy and move operations. Collections, which are similar to file system directories, may be created and listed.

WebDAV provides PUT and GET functions to upload/download structured documents to/from a web server. WebDAV provides further functions, such as MKCOL to make collections (directories), COPY and MOVE to copy, move and rename files and DELETE to delete files or collections. These functions allow one to use a server that is supporting WebDAV as a file system, in which WebDAV can be considered to be an access protocol to the file system. The implementation of the file system is independent from the access protocol. Collections and files are referred to as resources. For example, in one implementation, resources can be stored in the file system and further information, such as properties, can be stored in a relational database management system (RDBMS). In another implementation, properties and resources all can be stored in a RDBMS.

WebDAV also provides other functions, such as PROPFIND to list the properties of a resource, and PROPPATCH to set and change properties of resources through applications that make use of the resources.

File system 200 stores documents, such as structured document 210. Structured document 210 can be a markup-language document, such as an XML-, XHTML- or WML-document. Structured document 210 has at least one indexing-property, such as IP-1 and/or IP-2, and further has an identifier ID-1.

Process 100 includes an identificator 110, an extractor 120, a pre-defined extraction rule set 130, an index-value data structure 140 and interfaces 101-1 to 101-6.

Identificator 110 identifies structured document 210 in file system 200 for indexing. For example, structured document 210 has at least one indexing-property IP-1 and/or IP-2. An indexing-property can be a document-type, a URL and/or a document-version. Identificator 110 can access indexing-properties IP-1, IP-2 of structured document 210 via interface 101-1. In one example, access to indexing-properties is implemented by using the WebDAV function PROPFIND. In another example, accessing the indexing-properties can be implemented with a corresponding Structured Query Language (SQL)-statement. Identificator 110 compares the indexing-properties of structured document 210 with reference indexing-properties. For example, the reference indexing-properties can be stored in a corresponding table of a relational database system. Preferably, identificator 110 accesses the reference indexing-properties via interface 101-2. In another example, reference indexing-properties are stored in a specific property data structure. Index-value data structure 140 or the specific property data structure may be implemented as database tables in a RDBMS or as a further structured document, such as an XML file, that can be stored, for example, in file system 200. If identificator 110 identifies indexing-property IP-1 and/or IP-2 matching corresponding reference indexing-properties, the structured document 210 is subject to indexing.

Extractor 120 extracts at least one index-value IV-1 from structured document 210 in accordance with pre-defined extraction rule set 130. Extractor 120 is connected to pre-defined extraction rule set 130 via interface 101-4 and to structured document 210 via interface 101-5. Pre-defined extraction rule set 130 includes extraction rules 130-1, 130-2, 130-3. In one embodiment of the invention, extraction rules 130-1, 130-2, 130-3 are XPath-expressions.

XPath is a language that describes a way to locate and process items in Extensible Markup Language (XML) documents by using an addressing syntax based on a path through the document's logical structure or hierarchy. This makes writing programming expressions easier than if each expression had to understand typical XML markup and its sequence in a document. XPath also allows the programmer to deal with the document at a higher level of abstraction. XPath is a language that is used by and specified as part of both the Extensible Stylesheet Language Transformations (XSLT) and by XPointer (SML Pointer Language). It uses the information abstraction defined in the XML Information Set (Infoset). Since XPath does not use XML syntax itself, it could be used in contexts other than those of XML.

XPath uses syntax something like an informal set of directions for finding a particular geographic location. When telling someone how to find the Minneapolis campus of the University of Minnesota within the United States, for example, one might write:

US/MN/Mpls/SE/WashingtonAve/bridge which would put the user in the middle of the campus.

XPath uses the concepts of the concept node (the point from which the path address begins), the logical tree that is inherent in any XML document, and the concepts expressing logical relationships that are defined in the XML Information Set, such as ancestor, attribute, child, parent, and self. XPath includes a small set of expressions for specifying mathematics functions and the ability to be extended with other functions.

By applying extraction rule set 130 to structured document 210, the at least one index-value IV-1 is extracted. Extractor 120 then uses interface 101-6 to store extracted index-value IV-1 in index-value data structure 140 together with identifier ID-1 of structured document 210.

In another example, once the indexing of structured document 210 is finalized, an index status of structured document 210 is set to a value that indicates that the structured document has already been indexed. For example, the index status can be implemented as a property of structured document 210 that is set by using the WebDAV function PROPPATCH.

In an embodiment, identificator 110 and extractor 120 perform synchronously when a structured document is generated in file system 200 by using, for example, the WebDAV function PUT. For example, a document-check-in application generates structured document 210 and concurrently identificator 110 checks if structured document 210 is subject to indexing. If so, extractor 120 extracts index values (e.g. IV-1) according to extraction rule set 130 and the extracted index values are stored in index-value data structure 140 together with identifier ID-1 of structured document 210.

In another embodiment, identificator 110 and extractor 120 perform asynchronously. In other words, structured document 210 already exists in file system 200. However, it is not yet indexed (for example indicated by the index status). Identificator 110 and extractor 120 are triggered by a specific event. The specific event can be a control signal launched by a user or automatically generated by system 10, for example, at a specific point in time or at a regular interval, to continuously scan file system 200 for new structured documents to be indexed. For example, when a trigger occurs at night when only a few users interact with computer system 10, a large number of structured documents (e.g. in a batch run) can be processed without using CPU time that is needed by system processes for user interaction.

A specific implementation of extracting a specific index-value from structured document 210 is now explained by way of example.

The code shown in table 1 below illustrates a simplified XML-example of structured document 210 having identifier ID-1="1111."

TABLE 1

```
<?xml version="1.0" encoding="UTF-8"?>
    <department name="Development">
        <employeenumber>4</employeenumber>
        <employeelist>
            <Name>Peter</name>
            <year_of_birth>1966</year_of_birth>
            <Name>Michael</name>
            <year_of_birth>1968</year_of_birth>
            <Name>Ralf</name>
            <year_of_birth>1971</year_of_birth>
            <Name>Carolin</name>
            <year_of_birth>1984</year_of_birth>
        </employeelist>
    </department>
```

Extraction rule 130-1 corresponds to the following XPath expression:
XPath_Index_Name="/department/employeelist/name/text( )"

In other words, exctractor 120 extracts index-values (e.g. Peter, Michael, etc.) that are stored under the indexing-property name XPath_Index_Name in the code. Table 2 below shows entries that are stored in index-value data structure 140 when applying the Xpath-expression 130-1 to the above code of structured document 210.

TABLE 2

| identifier of structured document | name of indexing-property | value of indexing-property |
|---|---|---|
| ... | ... | ... |
| 1111 | XPath_Index_Name | Peter |
| 1111 | XPath_Index_Name | Michael |
| 1111 | XPath_Index_Name | Ralf |
| 1111 | XPath_Index_Name | Carolin |
| ... | ... | ... |

An example of another extraction rule 130-2 is:
XPath_Index_employeenumber="/department/employeenumber/text( )"

Applying extraction rule 130-2 to code above adds another entry for indexing-property XPath_Index_employeenumber to index-value data structure 140, as shown in table 3 below.

TABLE 3

| identifier of structured document | name of indexing-property | value of indexing-property |
|---|---|---|
| ... | ... | ... |
| 1111 | XPath_Index_Name | Peter |
| 1111 | XPath_Index_Name | Michael |
| 1111 | XPath_Index_Name | Ralf |
| 1111 | XPath_Index_Name | Carolin |
| 1111 | XPath_Index_employeenumber | 4 |
| ... | ... | ... |

Index-value data structure 140 can store index-values of a large number of structured documents. By using index-value data structure 140, structured documents can be identified via a corresponding query. For example, a query can request all structured documents that describe a department having more than three employees. In the example, the query at least identifies structured document 210 with identifier "1111".

By using a unique identifier for each version of a structured document or by using a version-property of the structured document, versioned indexing, i.e., indexing of multiple versions of a structured document, is automatically provided.

Figure 3:
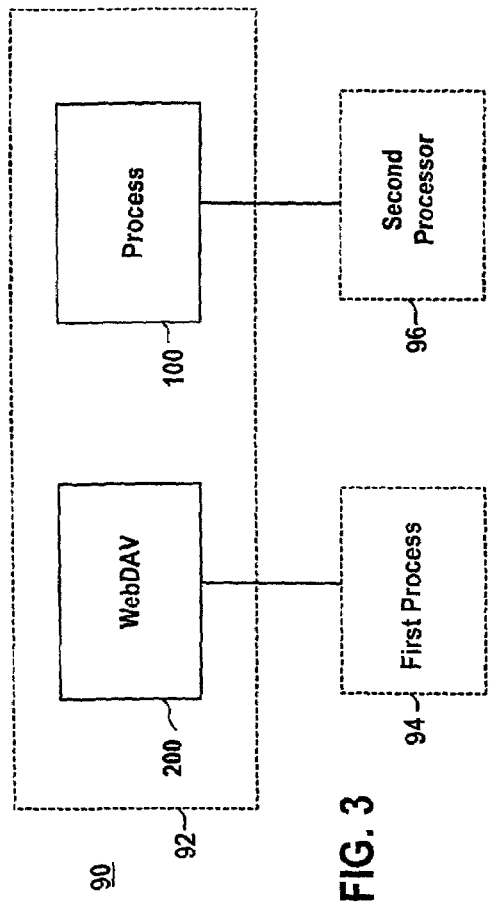
FIG. 3 is a block diagram of a computer.

As shown in FIG. 3, a computer 90 for indexing structured documents includes a file system 200 and process 100 residing in memory 92. Computer 90 includes a first processor 94 and a second processor 96, referred to sometimes as shared memory processors. The file system 200 is operated by first processor 94. In other words, program instructions to run file system 200 are executed by first processor 94. Process 100 is executed by second processor 96. Shared memory processors are utilized to improve performance of indexing computer 90. By using different processors for running the file system 200 and for performing indexing (process 100) of structured documents in the file system 200, the indexing has no impact on the performance of the file system 200 (e.g. the system response time when a user wants to check in a document into the file system).

Figure 4:
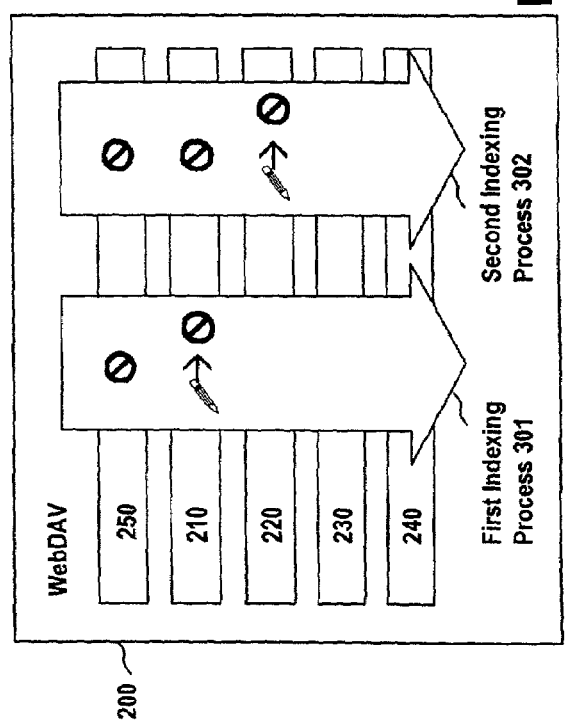
FIG. 4 is a flow diagram.

FIG. 4 shows a locking mechanism 300 for asynchronous indexing of structured documents. Symbol  refers to locked and symbol  refers to select and lock. To speed up indexing of structured document 210 and other structured documents 220-250 stored in file system 200, multiple indexing processes 301, 302 are used. In the example, first indexing process 301 recognizes that structured document 250 is already locked by another indexing process (not shown). Therefore, first indexing process 301 skips the locked structured document 250 and selects the next unlocked structured document 210 in file system 200. Concurrently with selecting structured document 210 first indexing process 301 locks structured document 210 while indexing the document. Second indexing process 302 recognizes that structured document 210 and 250 are already locked by other indexing processes and selects the next unlocked structured document 220. Concurrently with selecting structured document 220 second indexing process 302 locks structured document 220 while indexing the document. By using the select and lock feature, waiting times for indexing processes 301, 302 (until a locked structured document gets unlocked again) can be minimized.

Figure 5:
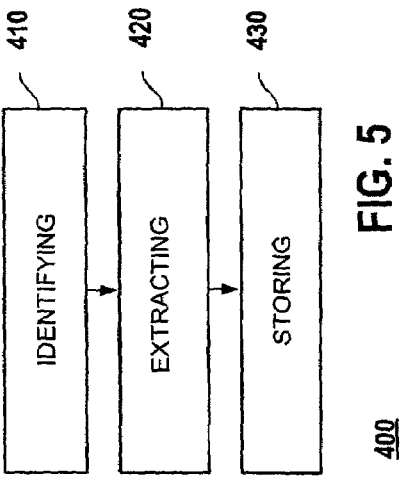
FIG. 5 is a diagram of a process for indexing structured documents.

As shown in FIG. 5, a process 400 for indexing structured documents in a computer storing a Web based Distributed Authoring and Versioning (WebDAV) file system 200 includes the acts of identifying (410), extracting (420) and storing (430).

In identifying (410), process 400 identifies structured document 210 in the WebDAV file system 200 for indexing. Structured document 210 has at least one indexing-property IP-1, IP-2 and has identifier ID-1. For example, the at least one indexing-property IP-1 and/or IP-2 can be a document-type, a URL, a document-version, etc. Structured document 210 can be a markup-language document, such as an XML-, XHTML- and WML-document. In an embodiment, the WebDAV file system 200 is stored in a relational database management system.

In extracting (420), process 400 extracts at least one index-value IV-1 from structured document 210 in accordance with pre-defined extraction rule-set 130. In one embodiment of the invention, pre-defined extraction rule set 130 includes XPath-expressions 130-1, 130-2, 130-3.

In storing (430), process 400 stores the at least one index-value IV-1 together with identifier ID-1 in index-value data structure 140. For example, index-value data structure 140 can be stored as a relational database table.

In one embodiment, WebDAV file system 200 is operated by first processor 94 and process 400 is executed by second processor 96.

In one example, process 400 is executed synchronously when generating the structured document 210 in the WebDAV file system 200. In another example, process 400 is executed asynchronously upon generating structured document 210 in WebDAV file system 200. In this example, process 400 is executed for structured document 210 by first indexing process 301 and can be executed for structured documents 220, 230, 240, 250 of WebDAV file system 200 by second indexing process 302. By using multiple indexing processes, multiple structured documents can be indexed concurrently. Preferably, second indexing process 302 skips structured document 210 when it is locked by first indexing process 301 and selects an unlocked structured document 220 from the structured documents 220, 230, 240, 250. By concurrently locking the unlocked structured document 220, second indexing process 302 prevents further indexing processes to access further structured document 220. Preferably, upon indexing a structured document, process 400 sets a corresponding indexing status of the document.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication.

The invention has been described in terms of particular embodiments. Other embodiments are within the scope of the following claims. For example, steps of the invention can be performed in a different order and still achieve desirable results.

What is claimed is:

1. A computer-implemented method for indexing structured documents comprising, at a server:
   applying a pre-defined rule-set to a plurality of versions of a first document in a plurality of structured documents to extract one or more index-values, the pre-defined rule-set including a plurality of rules, each rule having a distinct rule identifier, each extracted index-value being extracted by a rule in the pre-defined rule set, wherein one or more versions of the first document is concurrently accessible to a plurality of users for collaborative authoring; and
   for each extracted index-value, storing in an index-value data structure the extracted index-value, the rule identifier of the rule that extracted the index-value, and information identifying the first document and the respective version of the first document from which the index-value was extracted.

2. The computer-implemented method of claim 1 in which the plurality of structured documents are included in a Web based Distributed Authoring and Versioning (WebDAV) file system.

3. The computer-implemented method of claim 2 in which the WebDAV file system and the index-value data structure are stored in a relational database management system (RDMS).

4. The computer-implemented method of claim 2 in which applying and storing are executed synchronously when generating the first document in the WebDAV file system.

5. The computer-implemented method of claim 2 in which applying and storing are executed asynchronously when generating the first document in the WebDAV file system.

6. The computer-implemented method of claim 1 in which the first document includes an indexing property that matches a stored reference indexing-property selected from the group of document-type, URL, and document-version.

7. The computer-implemented method of claim 1 in which the first document is a markup language document with a markup-language selected from the group of XML, XHTML, and WML.

8. The computer-implemented method of claim 1 in which the index-value data structure is stored as a relational database table.

9. The computer-implemented method of claim 1 in which the plurality of rules included in the pre-defined extraction rule set each are defined by a corresponding XPath expression.

10. The computer-implemented method of claim 1 in which the plurality of structured documents are included in a file system that is processed by a first processor and the steps of applying and storing are executed by a second processor.

11. The computer-implemented method of claim 1 further comprising, at the server:
identifying a plurality of additional documents in the plurality of structured documents; and
repeating the steps of applying and storing for each of the plurality of additional documents.

12. The computer-implemented method of claim 1, wherein the index-value data structure is entirely generated by applying the pre-defined rule-set to documents in the plurality of structured documents.

13. The computer-implemented method of claim 1, wherein:
each of the versions of the first document is associated with a distinct document identifier; and
the information identifying the first document and the respective version of the first document from which the index-value was extracted comprises the distinct document identifier of the respective version of the first document from which the index-value was extracted.

14. The computer-implemented method of claim 1, wherein:
the first document is associated with a document identifier that is common to the plurality of versions of the first document; and
the information identifying the first document and the respective version of the first document from which the index-value was extracted comprises a version-property of the respective version of the first document from which the index-value was extracted and the document identifier.

15. A computer-implemented method comprising, at a server:
applying a pre-defined rule-set to each indexable document in a plurality of structured documents, including applying the pre-defined rule-set to a plurality of versions of an indexable document in the plurality of structured documents, to extract one or more index-values, the pre-defined rule-set including a plurality of rules, each rule having a distinct rule identifier, each extracted index-value being extracted by a rule in the pre-defined rule set, wherein one or more versions of the indexable document is concurrently accessible to a plurality of users for collaborative authoring; and
for each extracted index-value, storing in an index-value data structure the extracted index-value, the rule identifier of the rule that extracted the index-value, and information identifying the respective indexable document and a respective version of the respective indexable document from which the index-value was extracted.

16. The computer-implemented method of claim 15 further comprising, at the server:
identifying each document in the plurality of structured documents that has an indexing property that matches a stored reference indexing-property as an indexable document; and
determining for each indexable document whether the respective indexable document is locked.

17. The computer-implemented method of claim 15 in which the plurality of structured documents are included in a WebDAV file system.

18. The computer-implemented method of claim 15 in which each of the indexable documents is a markup language document.

19. An article comprising:
a storage medium having stored thereon instructions that when executed by a server computer result in the following:
applying a pre-defined rule-set to a plurality of versions of a first document in a plurality of structured documents to extract one or more index-values, the pre-defined rule-set including a plurality of rules, each rule having a distinct rule identifier, each extracted index-value being extracted by a rule in the pre-defined rule set, wherein one or more versions of the first document is concurrently accessible to a plurality of users for collaborative authoring; and
for each extracted index-value, storing in an index-value data structure the extracted index-value, the rule identifier of the rule that extracted the index-value, and information identifying the first document and the respective version of the first document from which the index-value was extracted.

20. A computer program product, tangibly stored on a machine readable medium, for indexing structured documents, comprising instructions operable to cause a server computer to:
apply a pre-defined rule-set to a plurality of versions of a first document in a plurality of structured documents to extract one or more index-values, the pre-defined rule-set including a plurality of rules, each rule having a distinct rule identifier, each extracted index-value being extracted by a rule in the pre-defined rule set, wherein one or more versions of the first document is concurrently accessible to a plurality of users for collaborative authoring; and
for each extracted index-value, store in an index-value data structure the extracted index-value, the rule identifier of the rule that extracted the index value, and information identifying the first document and the respective version of the first document from which the index-value was extracted.

* * * * *